United States Patent [19]

Kaufman

[11] Patent Number: 4,895,897
[45] Date of Patent: Jan. 23, 1990

[54] AROMATIC CARBONATE COMPOSITIONS MODIFIED WITH OXAZOLINE FUNCTIONALIZED POLYSTYRENE REACTED WITH AN ETHYLENE ELASTOMER CONTAINING REACTIVE POLAR GROUPS

[75] Inventor: Lawrence G. Kaufman, Somerville, N.J.

[73] Assignee: Exxon Chemical Patents Inc., Linden, N.J.

[21] Appl. No.: 322,592

[22] Filed: Mar. 13, 1989

Related U.S. Application Data

[63] Continuation of Ser. No. 231,691, Aug. 12, 1988, abandoned.

[51] Int. Cl.$^4$ .............................................. C08L 69/00
[52] U.S. Cl. ...................................... 525/67; 525/146; 525/147; 525/148
[58] Field of Search ................. 525/67, 146, 147, 148, 525/439, 468

[56] References Cited

U.S. PATENT DOCUMENTS 3,505,297  4/1970  Sheetz et al. ...................... 260/78.4
4,172,859 10/1979  Epstein ................................ 428/402
4,358,563 11/1982  Quinn et al. ........................ 525/146
4,444,950  4/1984  Sakano et al. ........................ 525/67

FOREIGN PATENT DOCUMENTS 0106096 4/1984 European Pat. Off. .
0119531 9/1984 European Pat. Off. .
0119533 9/1984 European Pat. Off. .

OTHER PUBLICATIONS

W. E. Baker and M. Saleem, "Coupling of Reactive Polystyrene and Polyethylene in Melts", *Polymer*, 1987, vol. 28, No. 12, pp. 2057–2062.
Sales presentation materials by Dow Chemical Company.
Product brochure from Uniroyal.

*Primary Examiner*—Theodore E. Pertilla
*Attorney, Agent, or Firm*—W. G. Muller

[57] ABSTRACT

Aromatic carbonate compositions having improved impact properties comprising an aromatic carbonate resin and a functionalized elastomeric polymer that is the reaction product of an ethylene elastomer having reactive polar groups and an oxazoline functionalized polystyrene are disclosed.

20 Claims, No Drawings

AROMATIC CARBONATE COMPOSITIONS MODIFIED WITH OXAZOLINE FUNCTIONALIZED POLYSTYRENE REACTED WITH AN ETHYLENE ELASTOMER CONTAINING REACTIVE POLAR GROUPS

This is a continuation of application Ser. No. 231,691, filed Aug. 12, 1988, now abandoned.

BACKGROUND OF THE INVENTION

1. Field of the Invention

This invention relates to improved thermoplastic compositions. In another aspect, it relates to aromatic carbonate compositions having improved properties including low temperature impact strength and impact strength after heat aging, the improvements provided through the addition of functionalized elastomeric polymers.

2. Description of Art in the Field

Aromatic carbonate compositions are known to have excellent physical properties, particularly high impact resistance and heat resistance, and are known as "engineering plastics". However the performance of these compositions tend to suffer in the area of resistance to crack propagation. This deficiency is illustrated in notch sensitivity, brittle breaks and occasional catastrophic failure of molded or extruded parts. The tendency of some of these polycarbonate compositions to break in brittle fashion, particularly in low temperature usage or after continuous or intermittent exposure at high temperatures, is a significant limitation of utility. The tendency toward brittle break behavior can be characterized by the notched Izod test ASTM D-256-56. With a normal notch of ⅛ (3.2 mm) inch, unmodified polycarbonate compositions will show a decrease from notched Izod values at room temperature of about 80% when tested at temperatures of about −20° C. Notched Izod values show a similar magnitude of decrease if the thickness of the sample is increased as little as ⅛ (3.2 mm) inch, to ¼ (6.4 mm) inch, even at room temperature. Aging at temperatures of about 125° C. for a period of about 4 hours shows similar results.

Consequently, there is much in the art concerned with improving the impact strength of aromatic carbonate and particularly polycarbonate compositions. A variety of additives have been added or suggested for addition to polycarbonates with some improvement in impact strength being obtained. U.S. Pat. No. 4,172,859 teaches toughened thermoplastic compositions of various materials including polycarbonate nresins admixed with about 1-40 wt. % of at least one random copolymer and sheared so as to disperse the random copolymers in the resin in a particle size of 0.01 to 3.0 microns. The random copolymer is said to be comprised of one or more monomers taken from eight classes of monomers, included within which are ethylene, propylene and non-conjugated dienes, specific examples being ethylene/propylene/1,4-hexadiene-g-maleic anhydride, ethylene/propylene/5-propenyl-2-norbornene-g-maleic anhydride, ethylene/propylene/1,4-hexadiene/norbornadiene-g-fumaric acid, ethylene/propylene/5-ethylidine-2-norbornene-g-fumaric acid (sic), and ethylene/propylene/1,4-hexadiene/5-ethylidiene-2-norbornene-g-fumaric acid (sic). Mixed polymers are said to include examples such as ethylene/propylene/1,4-hexadiene/norbornadiene with styrene/maleic anhydride and styrene/butadiene with ethylene/maleic anhydride. Improved notched Izod values as reportedly tested in accordance with ASTM-256-56 are taught and the improvement is said generally to be proportional to adherent sites in the polymeric component, the melt viscosity and molecular weight distribution.

U.S. Pat. No. 4,358,563 discloses a polycarbonate composition said to possess an improved thick section impact strength as measured by notched Izod. The improvement is said to arise from preparing an aromatic carbonate polymer endcapped with an XR moiety, where X is inclusive of derivatives of organic compounds such as phenol, carboxyl, carboxyl halides, R is an alkyl, alkenyl, aryl, etc., of about 5-20 carbons, and admixing with a polyolefin impact modifier. The polyolefins include, for example polyethylene, polypropylene, ethylene-propylene diene copolymers, etc.

U.S. Pat. No. 4,444,950 discloses the modification of polycarbonate compositions with excellent impact resistance and heat resistance to improve weld strength. The disclosed compositions are said to comprise (A) a polycarbonate resin and (B) a rubber modified copolymer with (C) an epoxy group containing olefin copolymer. (B) is said to comprise a graft copolymer of such as ethylene/propylene/non-conjugated diene copolymer, styrene/butadiene copolymer, etc., graft polymerized with monomers such as styrene, acrylonitrile, or an alkyl acrylate, and combined with a copolymer comprising these last-named monomers. (C) is said to be a copolymer of at least one unsaturated epoxy compound and at least one olefin with or without at least one ethylenically unsaturated compound, such as glycidyl methacrylate/ethylene/vinyl acetate copolymer or glycidyl methacrylate/ethylene copolymer.

European Patent Application No. 0 119 533 discloses polycarbonate resin compositions said to have improved impact strength, especially in thick sections, and resistance to environmental stress crazing and cracking. The improvements are attributed to the use of a modifier combination (b) comprising, e.g., (b) (i) a selectively hydrogenated linear copolymer of one or more blocks of a vinyl aromatic polymer segment, like polystyrene, and one or more blocks of an olefinic elastomer of butadiene, isoprene, etc., (b) (ii) an olefin-methacrylate copolymer like ethylene-methylmethacrylate or a methacrylate alone, and optionally (b) (iii) a polyolefin such as polyethylene, polypropylene, ethylene-propylene copolymers, polyisobutylene and EPDM copolymers.

European Patent Application No. 0 106 096 discloses polycarbonate resin compositions said to have improved resistance to environmental stress crazing and cracking. The improvements are attributed to the use of a modifier combination (b) comprising (i) a thermoplastic olefin polymer insoluble in the polycarbonate resin, such as polyethylene, polypropylene, polyisobutylene, copolymers of ethylene and propylene, and mixtures, and a linear low density polyolefin such as ethylene-butene-1.

European Patent Application No. 0 119 531 discloses polycarbonate resin compositions said to have improved impact strength, especially in thick sections, and weld line strength. The improvements are attributed to the use of certain acrylic-olefin co/terpolymers (c) prepared from olefins and acrylates or acrylics, e.g. ethylene-ethyl-acrylate, in a composition comprising a polycarbonate resin (a) and an olefin polymer or copolymer (b) such as polyethylene, polypropylene, ethylene-propylene copolymers, polyisobutylene, EPDM copolymers and linear low density polyolefins such as ethylene-butene-1.

In addition to the above it is known in the art that polymers containing alkenyloxazolines can be crosslinked to make novel polymers. U.S. Pat. No. 3,505,297 discloses the crosslinking and conversion of polymers containing alkenyloxazolines into infusible, water and solvent resistant polymers by reaction with a polycarboxylic acid, including polymers having plural carboxylic acid groups in the polymer molecule. The article "Coupling of reactive polystyrene and polyethylene in melts", by Baker and Saleem in *Polymer,* 1987, Vol. 28, No. 12, 2057–2062, discloses reacting polystyrene having oxazoline groups and polyethylene having carboxyl groups in a melt blend for the investigation of claims in the art of production of alloys having better impact strength and tensile properties than the ordinary polyethylene-polystyrene blends.

As indicated above there is a continuing need for novel means of improving various properties of polymer compositions including the impact strength of aromatic carbonate compositions. It is thus an object of the instant invention to provide novel functionalized elastomeric polymers that are useful as impact modifiers for polycarbonate compositions as well as to provide a means of improving the impact strength of these compositions. A further object thus, is achieving novel aromatic carbonate compositions having improved impact strength at low temperatures, in thicker sections and after continued exposure to high temperatures.

SUMMARY OF THE INVENTION

According to the invention, there is provided a thermoplastic composition improved in physical properties which comprises an aromatic carbonate resin and a functionalized elastomeric polymer. The functionalized elastomeric polymer will comprise an ethylene elastomer having specified polar groups reacted with an oxazoline functionalized polystyrene.

DESCRIPTION OF THE INVENTION

It has been discovered that the addition of the functionalized elastomeric polymer of this invention to a blend containing at least one aromatic carbonate resin is effective in positively upgrading the impact properties of these blends.

The instant invention is thus directed to an aromatic carbonate composition exhibiting improved impact properties comprised of:

(a) at least one aromatic carbonate resin: and (b) a functionalized elastomeric polymer comprising the reaction product of (i) an ethylene elastomer having at least one reactive polar group and (ii) an oxazoline functionalized polystyrene.

The term "aromatic carbonate" is meant herein to include polycarbonate, copolyester-carbonate and mixtures thereof. Such aromatic carbonate compositions are known in the art to be useful in various engineering plastic applications, particularly thermoplastic composition applications.

The polycarbonate resins utilized in the instant invention are well known in the art and are generally commercially available materials. These polycarbonates, as well as methods for their preparation, are described, inter alia, in U.S. Pat. Nos. 3,161,615, 3,220,973, 3,312,660, 3,312,659, 3,313,777, 3,666,614 and 3,939,672, all of which are incorporated herein by reference. These polycarbonates may be prepared by a variety of conventional and well known processes which include interfacial polymerization, pyridine process, transesterification, and melt polymerization. A convenient process for the preparation of these polycarbonates is the interfacial polymerization process involving the coreaction of at least one dihydric phenol with a carbonate precursor. Typically, the dihydric phenols used may be represented by the general formula

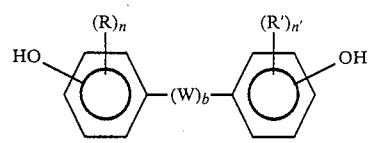

wherein:

R is independently selected from monovalent hydrocarbon radicals, monovalent hydrocarbonoxy radicals, and halogen radicals;

R' is independently selected from monovalent hydrocarbon, monovalent hydrocarbonoxy, and halogen radicals;

W is selected from divalent hydrocarbon radicals, —S—, —S—S—, —O—,

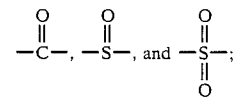

b is either zero or one; and n and n' are independently selected from integers having a value of from 0 to 4 inclusive.

The monovalent hydrocarbon radicals represented by R and R' include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms.

The monovalent hydrocarbonoxy radicals may be represented by the general formula —OR$^1$ wherein R$^1$ is a monovalent hydrocarbon radical of the type described hereinafore. Preferred monovalent hydrocarbonoxy radicals ar the alkoxy and aryloxy radicals.

The divalent hydrocarbon radicals represented by W include the alkylene radicals, the alkylidene radicals, the cycloalkylene radicals, and the cycloalkylidene radicals. The preferred cycloalkylene and cycloalkylidene radicals are those containing from 6 to about 16 ring carbon atoms. The preferred alkylene radicals are those containing from 2 to about 30 carbon atoms. The preferred alkylidene radicals are those containing from 1 to about 30 carbon atoms.

Some illustrative non-limiting examples of dihydric phenols of Formula I include:
2,2bis(4-hydroxyphenyl)propane (bisphenol-A);
bis(4-hydroxyphenyl)methane;
2,2-bis(3,5-dibromo-4-hydroxyphenyl)propane;
2,2-bis(3,5-dimethyl-4-hydroxyphenyl)propane;
1,1-bis(4-hydroxyphenyl)decane;
1,1-bis(4-hydroxyphenyl)cyclododecane;
1,5-bis(4-hydroxyphenyl)pentane;
4-4'-thiodiphenol;

1,1-bis(4-hydroxyphenyl)cyclohexane;
bis(4-hydroxyphenyl)ether; and
4,4'-dihydroxydiphenyl.

Other dihydric phenols are also available and are disclosed, inter alia, in U.S. Pat. Nos. 2,999,835, 3,028,365 and 3,334,154, all of which are incorporated herein by reference.

It is, of course, possible to employ a mixture of two or more different dihydric phenols as well as individual dihydric phenols in the preparation of the instant carbonate polymers.

The carbonate precursor employed may be a carbonyl halide, a carbonate ester, or a bis-haloformate. The carbonyl halides are carbonyl bromide, carbonyl chloride and mixtures thereof. Typical of the carbonate esters are diphenyl carbonate; di(halophenyl)carbonates such as di(chlorophenyl)carbonate, di(bromophenyl)carbonate, and di(trichlorophenyl)carbonate; di(alkylphenyl)carbonates such as di(tolyl)carbonate; di(naphthyl)carbonate; di(halonaphthyl)carbonates; phenyl tolyl carbonate; chlorophenyl chloronaphthyl carbonate; and mixtures thereof.

The bishaloformates include the bis-haloformates of dihydric phenols such as bisphenol-A and hydroquinone; bishaloformates of glycols such as ethylene glycol, neopentyl glycol, and polyethylene glycol; and the like. While other carbonate precursors will occur to those skilled in the art carbonyl chloride, also known as phosgene, is the preferred carbonate precursor.

The polycarbonates of the instant invention contain at least the following recurring structural unit:

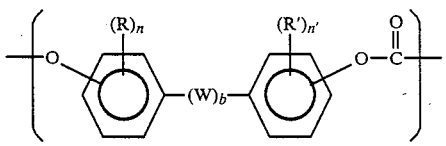

wherein R, R', b, n and n' are as defined hereinafore. These polycarbonates generally have an intrinsic viscosity, as measured in methylene chloride at 25° C., of at least about 0.38 dl/gm, preferably from about 0.4 to about 1.0 dl/gm.

In addition to the polycarbonates described hereinafore derived from a dihydric phenol and a carbonate precursor the instant invention also includes the thermoplastic randomly branched polycarbonates. These branched polycarbonates may be obtained by the reaction of said dihydric phenol, carbonate precursor, and a minor amount of a branching agent. The branching agent is generally a polyfunctional aromatic compound containing at least three functional groups which may be hydroxyl, carboxyl, carboxylic anhydride, haloformyl, and mixtures thereof. These polyfunctional aromatic compounds are well known in the art and are described, inter alia, in U.S. Pat. Nos. 3,525,712, 3,541,049, 3,544,514, 3,635,895, 3,816,373, 4,001,184 and 4,204,047, all of which are incorporated herein by reference. Some illustrative non-limiting examples of these polyfunctional compounds include trimellitic anhydride, trimellitic acid, trimellityl trichloride, 4-chloroformyl phthalic anhydride, pyromellitic anhydride, and trimesic acid. The amount of these compounds utilized is in the range of from about 0.05 to about 2 mole percent based on the amount of dihydric phenol utilized.

Copolyester-carbonates as well as methods for their preparation, are disclosed, inter alia, in U.S. Pat. Nos. 3,169,121, 4,238,596, 4,156,069, 4,238,597 and 4,628,074, all of which are incorporated herein by reference.

The copolyester-carbonates may be prepared by a variety of methods including melt polymerization, transesterification, and the interfacial polymerization processes.

These copolyester-carbonates may be readily prepared by the reaction of (i) at least one dihydric phenol, (ii) a carbonate precursor, and (iii) at least one ester precursor.

The ester precursor may be a difunctional carboxylic acid or, preferably, the ester forming reactive derivative of the difunctional carboxylic acid. In general, any difunctional carboxylic acid, and preferably any ester forming reactive derivative thereof, conventionally used in the preparation of linear polyesters may be utilized in the preparation of the instant copolyester-carbonates. In general the difunctional carboxylic acids, preferably their ester forming reactive derivatives, include the aliphatic carboxylic acids, the aromatic carboxylic acids, and the aliphatic-aromatic carboxylic acids, and their ester forming reactive derivatives. Useful difunctional carboxylic acids are disclosed in the above-referenced U.S. Pat. No. 3,169,121.

The "ethylene elastomer having reactive polar groups" of this invention comprises ethylene-containing elastomeric polymers that have been copolymerized or grafted with one or more polar group-containing compounds that are reactive with oxazoline functionalized polystyrene. Typically such compounds are the ethylenically-unsaturated compounds having one or more polar groups reactive with oxazoline, though certain saturated polar group-containing compounds will be effective as more fully described below. As applied to the polymers of this invention, the terms "elastomeric" or "elastomer" are defined to mean that when they are crosslinked, they are capable of recovering from large deformations quickly and forcibly. Free from diluents, the crosslinked polymers retract within one minute to less than 1.5 times their original lengths after being stretched at 18°–29° C. to twice their lengths and held for one minute before release. However, these polymers are used in the process of this invention in uncured state. These ethylene-containing elastomeric polymers generally have an ethylene content that can range from about 15 to 85 wt. % of the total polymer, preferably about 30 to 85 wt. %, most preferably about 40 to 80 wt. %.

The reactive polar group is typically an electrophilic group containing an active hydrogen. More preferably said electrophilic group containing an active hydrogen is a carboxylic acid, amino or hydroxyl (including phenolic) group. The reactive polar groups on the ethylene elastomer are provided most preferably by ethylenically-unsaturated carboxyl group-containing compounds which are either copolymerized during the preparation of the ethylene-containing elastomeric polymers or are grafted onto a previously existing polymer.

Copolymerization including the compound providing the reactive polar groups will be possible when all the monomers of the ethylene-containing elastomeric polymers are polymerizable by either conventional free radical catalysis or Ziegler catalysis. Copolymerizable monomers incorporated by free-radical catalysis include such comonomers as ethylene, alkyl acrylates, conjugated dienes, styrene, vinyl ether, vinyl sulfides, acrylonitrile, vinyl esters, acrylic acids, methacrylic acid, and the like. Such elastomeric polymers are known in the art as is their method of preparation. Illustrative of this knowledge is U.S. Pat. No. 4,017,557 which is incorporated by reference. As disclosed therein, free radical-polymerizable monomers, which can be incorporated into the copolymer to provide preferred reactive polar groups, are ethylenically-unsaturated carboxyl group-containing compounds frequently having the formulae

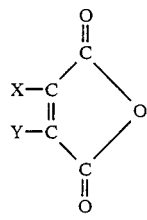

and

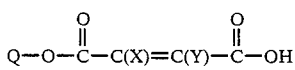

where X and Y are independently selected from H, Cl, $C_1$–$C_8$ alkyl, and phenyl; with the proviso that one of X and Y must be H; and Q is H, $C_1$–$C_{10}$ alkyl, phenyl, naphthyl, or substituted phenyl or naphthyl where the substituents are $C_1$–$C_{10}$ alkyl, halogen, or $C_1$–$C_{10}$ alkoxy groups. Other possible monomers, which are not represented by either formula I. or formula II., are itaconic acid, its anhydride, and monoesters.

Compounds representative of formula I include maleic anhydride and citraconic anhydride. Compounds representative of formula II include maleic acid, citraconic acid, fumaric acid, mesaconic acid, and monoesters of maleic and fumaric acids, including the methyl, ethyl, isopropyl, propyl, butyl, tert-butyl, amyl, isoamyl, hexyl, octyl, decyl, phenol, 1-naphthyl, 2-naphthyl, 2-methylphenyl, 2-ethylphenyl, 2,5-dimethylphenyl, 4-isopropylphenyl 4-butylphenyl, 3,5-di-methyl-3-propylphenyl, 3-decylphenyl, 4-tetradecylphenyl, 4-hexadecylphenyl, 4-octadecylphenyl, 2-chlorophenyl, 4-methoxyphenyl, 4-bromophenyl, 2-chloro-1-naphthyl, 4-chloro-1-naphthyl, 6-chloro-1-naphthyl, 7,8-dichloro-1-naphthyl, 4-bromo-1-naphthyl, 7-chloro-2-naphthyl, 4-methyl-1-naphthyl, and 1-propyl-2-naphthyl esters.

A representative copolymer of this nature is a random copolymer of ethylene, methyl acrylate, and from 0.0025 to 0.077 moles/100 grams of polymer of monoethyl maleate, each 100 grams of copolymer having about 0.64–0.80 moles of (—$CO_2$—) units.

In addition to the preferred reactive polar groups above, it is known in the art that other functional groups are reactive with oxazoline and can form the basis for the reaction product with the oxazoline functionalized polystyrenes when incorporated into an elastomeric polymer, such as by copolymerization or grafting. Included in such functional groups are the carboxyl, hydroxy, epoxy, primary and secondary amino. Representative formulae are:

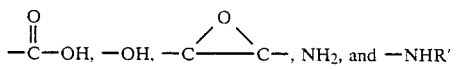

where R' is a hydrocarbyl radical, including alkyl, aryl, alkaryl, aralkyl, linear or cyclical, containing from 1 to about 20 carbon atoms, so long as this hydrocarbyl radical does not present substantial steric hindrance for the formation of the sought reaction product. Thus copolymerizable or graft monomers permitting the incorporation of these reactive polar groups into the elastomeric polymer will be useful in accordance with this invention. Such compounds, methods of both preparation and incorporation with elastomeric polymers, are also well-known. Descriptions for Ziegler copolymerization are to be found, inter alia, in U.S. Pat. Nos. 3,492,227, 3,761,458, 3,796,687, 4,017,669, 4,139,417 and 4,423,196, the disclosures of which, including compounds and processes, are incorporated by reference. These patents teach the preparation of elastomeric ethylene random terpolymers, tetrapolymers, etc., from alpha-olefins, non-conjugated dienes and unsaturated functional monomers by direct Ziegler-Natta polymerization of the monomers, usually in solvent, utilizing catalyst systems composed of trivalent, and higher, vanadium compounds, organoaluminum compounds and halogenated reactivator compounds. These polymerization reactions are run in the absence of moisture in an inert atmosphere and in a preferred temperature range of 0° to 65° C. Both continuous and batch reactions are taught. Typical compounds include: alkenyl alcohols, e.g., 4-pentene-1-ol, 10-undecen-1-ol, 2-norbornene-5-methanol, ethylenically unsaturated acids, e.g., acrylic acid, methacrylic acid, 2-norbornene-5-acetic acid, undecylenic acid; amides, e.g., undecylamide, acrylamide, methacrylamide; unsaturated derivatives of imides, e.g., N-alkenated cyclic imide derivatives of such as maleimide, N-allyl succinimide, and the like.

The ethylene elastomers having reactive polar groups of this invention can also be prepared by the process disclosed and taught in co-pending application Ser. No. 059,711, assigned to the assignee of this application and incorporated herein by reference. In accordance with the disclosure of this co-pending application ethylene, alpha-olefins, non-conjugated dienes and unsaturated functional monomers chemically "masked" by pre-reaction with certain non-halogenated organometallic compounds, can be copolymerized in a conventional Ziegler-Natta polymerization reaction utilizing, e.g., vanadium, zirconium or titanium catalysts with organoaluminum co-catalysts and conducted generally in solvent at temperatures ranging preferably from about 15°–60° C. The ethylene elastomers of this invention can then be produced by de-ashing the initially formed polymer by known methods utilizing various aqueous liquids, separating the resulting aqueous phase from the polymer-rich solvent phase and subsequently separating the polymer from the polymer-rich solvent phase.

The ethylene-containing elastomeric polymers most suitable for grafting with the reactive polar group-containing monomers are ethylene-alpha-olefin elastomers. These ethylene-alpha-olefin elastomers are also well-known in the art and commercially available.

"Ethylene-alpha-olefin elastomer" is meant herein to include generally both EPM and EPDM rubber polymers disclosed in the prior art. EPM rubber polymers are formed by interpolymerization of ethylene and one or more higher mono-olefins, particularly alpha-olefins, having from 3 to 25 carbon atoms, preferably propylene. The higher mono-olefins suitable for use may be branched or straight chain, cyclic and aromatic substituted or unsubstituted and are preferably alpha-olefins having from 3 to 16 carbon atoms. Illustrative non-limiting examples of preferred alpha-olefins are propylene, 1-butene, 1-pentene, 1-hexene, 1-octene and 1-dodecene. Mixed olefins can also be used (e.g., propylene and 1-butene, mixed butenes, etc.). The alpha-olefin is generally incorporated into the EPM rubber polymer in an amount of about 10 to about 85 wt. %, more preferably at about 15 to about 70 wt. % and even more preferably about 20 to about 60 wt. %.

The alpha-olefins, when substituted, should not be aromatic substituted on the 2-carbon position (e.g., moieties such as $CH_2=CH-\phi-$ should not be employed), since such an aromatic group interferes with the subsequent desired polymerization. Illustrative of such substituted alpha-olefins are compounds of the formula $H_2C=CH-C_nH_{2n}-X'$ wherein n is an integer from 1 to 20 carbon atoms (preferably 1 to 10 carbon atoms), and $X'$ comprises aryl, alkylaryl or cycloalkyl. Exemplary of such $X'$ substitutes are aryl of 6 to 10 carbon atoms (e.g., phenyl, naphthyl and the like), cycloalkyl of 3 to 12 carbon atoms (e.g., cyclopropyl, cyclobutyl, cyclohexyl, cyclooctyl, cyclodecyl, cyclododecyl and the like), alkaryl of 7 to 15 carbon atoms (e.g., tolyl, xylyl, ethylphenyl, diethylphenyl, ethylnaphthyl and the like). Also useful are alpha-olefins substituted by one or more such $X'$ substituents wherein the substituent(s) are attached to a non-terminal carbon atom, with the proviso that the carbon atom so substituted is not in the 1- or 2-carbon position in the olefin. Included are the alkyl-substituted bicyclic and bridged alpha-olefins, of which $C_1-C_9$ alkyl substituted norbornenes are preferred (e.g., 5-methyl-2-norbornene, 5-ethyl-2-norbornene, 5-(2'-ethylhexyl)-2-norbornene and the like).

EPDM rubber polymers are formed of ethylene and one or more higher mono-olefins as described above, plus one or more polymerizable non-conjugated dienes. Non-conjugated dienes suitable for purposes of the present invention can be straight chain, hydrocarbon di-olefins or cycloalkenyl-substituted alkenes, having about 6 to about 15 carbon atoms, for example:

A. straight chain acyclic dienes, such as 1,4-hexadiene and 1,6-octadiene;

B. branched chain acyclic dienes, such as 5-methyl-1,4-hexadiene; 3,7-dimethyl-1,6-octadiene; 3,7-dimethyl-1,7-octadiene; and the mixed isomers of dihydromyricene and dihydro-ocinene;

C. single ring alicyclic dienes, such as 1,3-cyclopentadiene; 1,4-cyclohexadiene; 1,5-cyclo-octadiene and 1,5-cyclododecadiene;

D. multi-ring alicyclic fused and bridged ring dienes, such as tetrahydroindene; methyl-tetrahydroindene; dicyclopentadiene; bicyclo(2.2.1)-hepta-2,5-diene; alkenyl, alkylidene, cycloalkenyl and cycloalkylidene norbornenes, such as 5-methylene-2-norbornene (MNB), 5-prophecy-2-norbornene, 5-isopropylidene-2-norbornene, 5-(4-cyclo pentenyl)-2-norbornene, 5-cyclohexylidene-2-norbornene and 5-vinyl-2-norbornene;

E. cycloalkenyl-substituted alkenes, such as allyl cyclohexene, vinyl cyclooctene, allyl cyclodecene, vinyl cyclododecene.

Of the non-conjugated dienes typically used, the preferred dienes are dicyclopentadiene, 1,4-hexadiene, 5-methylene-2-norbornene and 5-ethylidene-2-norbornene. Particularly preferred diolefins are 5-ethylidene-2norbornene (ENB) and 1,4-hexadiene. The non-conjugated diene is incorporated into the polymer in an amount of from about 0.1 to about 15 wt. %; more preferably, from about 0.5 to 2 wt. %, most preferably from about 1 to about 10 wt. %.

The ethylene-alpha-olefin elastomers of this invention can be prepared by procedures known in the art. In fact, various examples of such commercially available copolymers are VISTALON ®, elastomeric copolymers of ethylene and propylene alone or with 5-ethylidene-2-norbornene, marketed by Exxon Chemical Company, Houston, Tex., and Nordel ®, a copolymer of ethylene, propylene and 1,4-hexadiene, marketed by E. I. duPont de Nemours & Company, Wilmington, Del.

These ethylene copolymers, terpolymers, tetrapolymers, etc., are readily prepared using soluble Ziegler-Natta catalyst compositions. For a review of the literature and patent art see: "Polyolefin Elastomers Based on Ethylene and Propylene", by F. P. Baldwin and G. Ver Strate in Rubber Chem. & Tech. Vol. 45, No. 3, 709–881 (1972) and "Polymer Chemistry of Synthetic Elastomers", edited by Kennedy and Tornqvist, Interscience, N.Y., 1969. For more recent review see: "Elastomers, Synthetic (Ethylene-Propylene)" by E. L. Borg in Encyclopedia of Chemical Technology, 3d Ed., Vol. 8, 492–500 (Kirk-Othmer, 1979) and "Ethylene-Propylene Elastomers", by G. Ver Strate in Encyclopedia of Polymer Science and Engineering, Vol. 6, 2d Ed., 522–564 (J. Wiley & Sons, 1986).

Suitable polymers may be prepared in either batch or continuous reactor systems, in gas phase, solution or slurry polymerizations. In particular, effective use can be made of a tubular reactor system to achieve novel molecular composition and molecular weight distribution in accordance with U.S. Pat. No. 4,540,753, which is incorporated herein by reference. In common with all Ziegler-Natta polymerizations, monomers, solvents and catalyst components are dried and freed from moisture, oxygen or other constituents which are known to be harmful to the activity of the catalyst system. The feed tanks, lines and reactors may be protected by blanketing with an inert dry gas such as purified nitrogen. Chain propagation retarders or stoppers, such as hydrogen and anhydrous hydrogen chloride, may be fed continuously or intermittently, to any but the tubular reactor of U.S. Pat. No. 5,540,753, for the purpose of controlling the molecular weight and/or MWD within the desired limits.

Additionally it is known to incorporate "branch suppressors" during the EPDM polymerization to reduce branching. It is known in the art that certain Lewis bases, e.g., $NH_3$, are effective as branch suppressors. Additionally certain alkoxy silanes, e.g., methyl silicate $(Si(OMe)_4)$, ethyl silicate $(Si(OEt)_4)$, etc., have been recently discovered to act as effective branch suppressors without reducing catalyst efficiency or reactivity. The particular amount of suppressor required to suppress branching will depend on the nature of the suppressor, the diolefin, the catalyst system, the Al/V ratio and the polymerization conditions. The use of excessive amounts of silicates will result in reduced catalyst activity. The silicate concentration can also be expressed in terms of Si/V mole ratio and can vary from about 0.1 to about 3.0. The vanadium and aluminum compounds can be added to the reactor either separately or premixed with one another. The silicates, optionally used as branching suppressors, should be added to the reactor separately and not in combination with any of the catalyst components in order to avoid reaction with the catalyst components and an alteration of their polymerization characteristics.

The molecular weight range of the ethylene-containing elastomeric polymers useful in this invention is that disclosed in the art and will typically range from about 5,000 to 1,000,000 weight average molecular weight ($M_w$), typically about 10,000 to 500,000 $M_w$, most typically about 15,000 to about 350,000 $M_w$. Mooney viscosity ($ML_{1+8}$, 127° C.) will typically range from about 10 up to about 90, more typically about 20 to about 75.

The graft addition of the ethylenically-unsaturated carboxyl group-containing compounds described above, e.g. maleic anhydride, is conveniently accomplished by heating a blend of the ethylene-alpha-olefin elastomer and the ethylenically-unsaturated carboxyl group-containing compounds within a range of about 225°–400° C., often in the presence of free-radical initiators such as organic peroxides. Methods of preparing these graft polymers are well-known in the art as is illustrated in U.S. Pat. Nos. 4,017,557 (above), 3,862,265, 3,884,882, 4,160,739, 4,161,452, 4,144,181, 4,506,056, and 4,749,505, the disclosures of which are incorporated herein by reference. The use of heat and/or physical shearing, optionally with the free-radical initiators, in such equipment as extruders or masticators to simultaneously accomplish controlled degradation in molecular weight of the ethylene-alpha-olefin elastomer along with the free-radical grafting of ethylenically-unsaturated carboxyl group-containing compounds, all as known in the art, will be particularly useful in accordance with this invention.

The graft addition to ethylene-alpha-olefin elastomers of carboxylic acid group-containing monomers, epoxy group-containing monomers, primary and secondary nitrogen-containing monomers and hydroxyl group-containing monomers is also known. Description appears in, inter alia, U.S. Pat. Nos. 3,862,265, 4,026,967, 4,068,057, 4,388,202 and 4,749,505, the disclosures of which are incorporated by reference. As is noted, these grafting methods parallel those useful for the grafting of maleic anhydride described more fully above. Epoxy group-containing compounds effective in such grafting reactions are represented by such as glycidyl acrylate, glycidyl methacrylate, and the like. In particular, U.S. Pat. No. 4,068,057 describes the mechanically induced amino-grafting of alpha-olefin polymers with saturated mono-and polyamines that may additionally include other groups such as hydroxy, additional amine, imidazoline, and the like. One or more reactive polar groups useful in accordance with this invention are thus readily incorporated in the ethylene-elastomer of this invention by use of knowledge in the art.

Though the descriptions herein with respect to the incorporation of reactive polar groups are directed to conventional copolymerization and grafting methods, it will be apparent to those in the art that any additional methods for such incorporation will be effective to achieve the objectives of this invention. For example, the preparation of epoxy group-containing polymeric compounds by the direct epoxidation of elastomer compounds containing either backbone or pendent unsaturation is known in the art. U.S. Pat. Nos. 3,330,794, 3,448,174 and 3,551,518 describe the use of epoxidizing agents, such as perbenzoic acid, to directly oxidize unsaturation in ethylene-containing elastomeric compounds to attain incorporated epoxy, or oxirane, groupings. These disclosures are incorporated by reference.

The amount of the reactive polar group-containing compound incorporated in the ethylene elastomer having reactive polar groups will be that sufficient to provide at least one site reactive with the oxazoline functionalized polystyrene, that is monomers containing reactive polar groups should make up at least about 0.01 wt. % of the ethylene elastomer component. Most typically, the reactive polar group-containing monomer will make up from 0.01 to 10 wt. %, preferably 0.05 to 5.0 wt. %. The mount of functional moieties present whether contributed by functional group-containing monomers, or by direct functionalization, will thus be that equivalent to this level of monomer incorporation.

The oxazoline functionalized polystyrene of this invention is also known in the art. U.S. Pat. No. 3,505,297 teaches both the preparation of oxazoline containing monomers, by the reaction of certain imidoester hydrohalides with a strong base, as well as the homo- and copolymerization of these monomers by conventional methods of addition polymerization using free-radical initiating catalysts, the disclosures of this patent are incorporated by reference. As is also disclosed in European Patent Application No. 0 146 965, the oxazoline functionalized polystyrene of this invention can be prepared by copolymerizing styrene, for example, with a monomer mixture comprising an ethylenically unsaturated monomer containing a cyclic iminoether group. Such cyclic iminoether groups can be described by the general structure

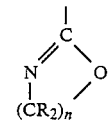

wherein each $R_2$ is independently hydrogen, or an inertly substituted hydrocarbon containing 18 or fewer carbon atoms; and n is a number from 1 to 5. Said cyclic iminoether group can be attached to the polymer chains through any of the carbon atoms in the ring. Preferably, the cyclic iminoether is a 2-minoether, i.e., attached to the polymer chain through the 2-carbon atom to yield a structure represented as

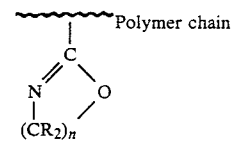

wherein $R_2$ and n are as defined hereinbefore. Preferably, each $R_2$ is hydrogen or lower alkyl and n is 1, 2 or 3. Most preferably, each $R_2$ is hydrogen, n is 2 and the cyclic iminoether is a 2-oxazoline group. By "inertly substituted" it is meant that the referenced group contains no functional group which interferes with the polymerization or curing of the oxazoline group. Preferably, such monomer is a 2-alkenyl-2-oxazoline wherein said alkenyl group contains from 2 to 8, preferably 2 to 4 carbon atoms. Most preferably, said monomer is 2-isopropenyl-2-oxazoline.

Included within the term "polystyrene" for the purposes of this invention are those polymers which comprise not only monomers of styrene, in major part, but also in minor part those monomers known in the art to be copolymerizable both with styrene and the ethylenically-unsaturated monomer containing a cyclic iminoether group. As will be obvious to those of ordinary skill in the art two or more of these copolymerizable monomers may be combined with styrene to constitute a useful polystyrene as defined herein. Of particular usefulness in the practice of this invention is the polymer comprised of styrene, acrylonitrile and 2-isopropenyl-2-oxazoline.

Included in the monomers which can be so copolymerized are the known ethylenically unsaturated polymerizable monomers which are non-acidic, i.e., neutral or basic in that they do not have acid substituents such as —COOH, —SO$_3$H, —COCl, and acid anhydrides. Suitable basic and neutral ethylenically unsaturated polymerizable monomers include the non-acidic alkenylaromatic compounds, the esters, salts, nitriles, and amides of ethylenically unsaturated acids, esters of unsaturated alcohols, unsaturated ethers, unsaturated ketones, ethylenically unsaturated aliphatic hydrocarbons, and other neutral or basic compounds containing one or more ethylenic linkages capable of addition polymerization. Specific examples of such non-acidic ethylenically unsaturated compounds are styrene, alpha-methylstyrene, ar-methylstyrene, ar-ethylstyrene, alpha,ar-dimethylstyrene, ar,ar-dimethylstyrene, divinylbenzene, vinylnaphthalene, divinylnaphthalene, hydroxystyrene, methoxystyrene, aminostyrene, styrene, cyanostyrene, acetylstyrene, monochlorostyrene, dichlorostyrene, other halostyrenes, vinylpyridine, salts of acrylic and methacrylic acids, methyl methacrylate, ethylacrylate, glycol diacrylate, hexyl acrylate, lauryl methacrylate, phenyl acrylate, allyl acrylate, acrylonitrile, methacrylonitrile, acrylamide, methacrylamide, acrylanilide, ethyl a-chloroacrylate, diethyl maleate, diallyl fumarate, vinyl acetate, vinyl propionate, vinyl butyrate, vinyl benzoate, vinyl chloride, vinyl bromide, vinylidene chloride, vinylidene bromide, vinyl methyl ketone, methyl isopropenyl ketone, vinyl carbazole, vinyl ethyl ether, divinyl ether, isobutylene, 1,3-butadiene, isoprene, and the like.

Since the cyclic iminoether group apparently forms a linkage with the carboxylic acid group in forming the reaction product of the ethylene elastomer having an amine-reactive site and the oxazoline functionalized polystyrene, it is readily seen that the degree of cross-linking and the molecular weight of the functionalized elastomeric polymer of this invention can be controlled with the proportion of cyclic iminoether groups and the reactive polar group-containing compounds. To be effective within the scope of this invention it is only essential that the amount of cyclic iminoether groups be sufficient to provide at least one reactive site on the polystyrene component, that is monomers containing cyclic iminoether groups should make up at least about 0.01 wt. % of the polystyrene component. Most typically, the cyclic iminoether group-containing monomers will make up from 0.01 to 10 wt. %, preferably 0.05 to 5.0 wt. %.

The functionalized elastomeric polymer of this invention will comprise the reaction product of the above described ethylene polymer having a reactive polar group and the oxazoline functionalized polystyrene. The reaction is accomplished by contacting the ethylene polymer with the functionalized polystyrene whereupon interaction and cross-linking take place. For best results, an approximately equivalent molar proportion of oxazoline moiety to carboxyl group can be employed. The contacting can be accomplished by combining solutions of the polymeric reactants in suitable solvents, such as benzene, toluene, and other inert inorganic solvents, in a suitable reaction vessel under substantially anhydrous conditions. Though heating will accelerate the reaction such is not necessary as the reaction is exothermic and will occur at ambient temperatures.

More preferably commercially, the contacting can be accomplished by premixing preformed pellets of the neat functionalized polymers and melt processing in a physical blender or mixer, such as an extruder, at temperatures of from about 200° to 350° C. It is important that essentially all moisture or water be removed by drying prior to contacting the polymer reactants in order to avoid hydrolysis reactions which will compete with the sought cross-linking and reduce the yield of the functionalized elastomeric polymer.

The amounts of functionalized elastomeric polymer present in the polycarbonate compositions of the instant invention are amounts which are effective to positively upgrade the impact properties of these compositions. Greater than these amounts may be used so long as the properties desired for a particular purpose of these compositions are substantially maintained. That is to say, the amounts of the functionalized elastomeric polymer present in the instant compositions are amounts which are at least effective to improve the impact properties of the polycarbonate compositions but insufficient to substantially deleteriously affect the advantageous properties of said compositions.

Generally a minimum of about 2 wt. % of said functionalized elastomeric polymer is sufficient to observe an improvement in the impact properties of the polycarbonate compositions. A minimum of about 3 wt. % of the functionalized elastomeric polymer is preferred, while a minimum of about 6 wt. % is more preferred. A level of about 35 wt. % of said functionalized elastomeric polymer, preferably a level of about 30 weight should generally not be exceeded. Weight percent of said functionalized elastomeric polymer is measured as the amount of said functionalized elastomeric polymer in the total of said functionalized elastomeric polymer and said polycarbonate composition. The instant compositions thus generally contain from about 2 to about 35 wt. % of said functionalized elastomeric polymer, preferably from about 3 to about 30 wt. %, most preferably 6 to about 25 wt. %.

The compositions of the instant invention may optionally contain the commonly known and used additives such as, for example, antistatic agents; antioxidants; inert fillers; ultraviolet radiation stabilizers such as the benzophenones, benzotriazoles, and cyanoacrylates; hydrolytic stabilizers such as the epoxides disclosed in U.S. Pat. Nos. 3,489,716, 3,138,379 and 3,839,247, all of which are incorporated herein by reference; color stabilizers such as the organophosphites disclosed in U.S. Pat. Nos. 3,305,520 and 4,118,370, both of which are incorporated herein by reference; and flame retardants.

Some particularly useful flame retardants are the alkali and alkaline earth metal salts of sulfonic acids. These types of flame retardants are disclosed, inter alia, in U.S. Pat. Nos. 3,933,734, 3,948,851, 3,926,908, 3,919,167, 3,909,490, 3,953,396, 3,931,100, 3,978,024, 3,953,399, 3,917,559, 3,951,910 and 3,940,366, all of which are incorporated herein by reference. These additives are present in the instant compositions in amounts which are effective to render said composition, flame retardant, i.e., a flame retardant amount. Additionally, halogenated, particularly brominated compounds such as tetrabromobisphenol-A carbonate, decabromo diphenyl oxide, tetrachlorodiphthalimide and the like can also be employed alone or together with the salts in flame retardant amounts. In general these amounts range from about 0.1 to about 10 wt. %, based on the total amounts of said additives and aromatic carbonate resins and functionalized elastomeric polymers.

The modified aromatic carbonate compositions of the instant invention are typically produced as described above during melt processing. If used, the conventional additives are mechanically blended and the resulting compositions of the invention are molded in the known fashion. Generally the components may be mixed in a mixer, such as a ribbon blender, V-shaped blender, tumbler or Henschel mixer, and then melt-kneaded at temperatures of 200°–350° C. in a Banbury mixer, single or multiscrew extruder, rolling mill, continuous extruder or the like. For example, suitably dried and preselected amounts of the ingredients can be mixed in a blender and fed into a single screw extruder and grinder for pelletization. The resulting pellets or granules are thereafter injection molded.

The compositions of the instant invention are useful in the preparation of shaped articles, molded articles, and the like.

The following examples, wherein all parts and percentages are on a weight basis unless otherwise specified, and which include preferred embodiments as currently known, further illustrate the present invention.

EXAMPLES

In each of the following examples, a composition comprising a commercially available amorphous polycarbonate resin product (LEXAN 141, produced by General Electric Company, Mt. Vernon, Ind.) and elastomeric polymer was prepared by tumble mixing of the two dried components in a glass jar. The mixture was then fed to a Brabender extruder maintained at temperatures from 250°–260° C. The resulting blend was collected and ground into pellets of a size suitable for feeding into the injection molder. The pellets were then dried and injection molded into test specimens, measuring about 63.5 mm×12.7 mm×3.2 mm (⅛") and about 63.5 mm×12.7 mm×6.4 mm (¼").

The specimens thus prepared were subjected to the Notched Izod Impact test in accordance with the ASTM D256 test method and the results are set forth in Table I.

EXAMPLE 1

This comparison example illustrates the properties of the unmodified polycarbonate resin.

EXAMPLES 1A–1C

These comparison examples illustrate the properties of three polycarbonate compositions that have been modified with varying levels of an unreacted elastomeric polymer, (VISTALON 457, a commercially available product from Exxon Chemical Company, Houston, Tex.), having 43% ethylene and a Mooney Viscosity ($ML_{1+8}$, 127° C.) of 25, that is without grafting of carboxylic group-containing compounds and the subsequent reaction with functionalized polystyrene. 1A had an elastomeric polymer content of 10%, 1B had 20% and 1C had 30%.

The functionalized elastomeric polymer of Examples 2A through 4C was provided as follows. A maleic anhydride grafted ethylene-propylene copolymer having 0.65% maleic anhydride, 43% ethylene and a melt flow rate of 3–4 g/10 minutes was also provided by Exxon Chemical Company. This "reactive" ethylene-propylene graft polymer was dry blended with a commercially available oxazoline functionalized polystyrene, called Reactive Polystyrene ("RPS") available from Dow Chemical Company, Midland, Mich. This RPS had a molecular weight of 200,000, a melt flow rate of 7 g/10 min. and an oxazoline content of 1%.

For Example 5 an oxazoline functionalized polystyrene, having a 70/30 styrene/acrylonitrile content and 1% oxazoline, with a molecular weight of 135,000 and melt flow rate of 14 g/10 min., was substituted.

Melt processing was accomplished for the elastomer/polystyrene reaction blends in a ¾", 24:1 L/D (length/diameter), 3:1 compression ratio Brabender extruder operated with four temperature zones of 250° C., 240° C., 240° C. and 250° C. with a die temperature of 260° C.

The resulting reaction product was maintained in dry condition at 80° C. until mixed with the polycarbonate resin. The mix was then melt processed in the Brabender extruder, collected and prepared for addition to the injection molder. For all specimens, the injection molder was operated at an entry temperature of 280° C., middle temperature of 300° C. and tip temperature of 300° C. The mold was initially 80° C. Injection time took 5 seconds and the material was subjected to a cooling time of 20 seconds.

EXAMPLES 2A–2C

These examples illustrate the properties of polycarbonate compositions prepared in accordance with this invention. A functionalized elastomeric polymer, comprising the ethylene-propylene copolymer grafted with maleic anhydride and reacted with RPS so as to incorporate 12.5% RPS, was blended with LEXAN 141. 2A had 10% functionalized elastomeric polymer, 2B had 20% and 2C had 30%.

EXAMPLES 3A–3C

These examples additionally illustrate the properties of polycarbonate compositions prepared in accordance with this invention. A functionalized elastomeric polymer, comprising the ethylene-propylene copolymer grafted with maleic anhydride and reacted with RPS so as to incorporate 20% RPS, was blended with LEXAN 141. 3A had 10% functionalized elastomeric polymer, 3B had 20% and 3C had 30%.

EXAMPLES 4A–4C

These examples additionally illustrate the properties of polycarbonate compositions prepared in accordance with this invention. A functionalized elastomeric polymer, comprising the ethylene-propylene copolymer grafted with maleic anhydride and reacted with RPS so as to incorporate 30% RPS, was blended with LEXAN 141. 4A had 10% functionalized elastomeric polymer, 4B had 20% and 4C had 30%.

EXAMPLE 5

This example illustrates the properties of another polycarbonate composition prepared in accordance with this invention. A functionalized elastomeric polymer, comprising the ethylene-propylene copolymer grafted with maleic anhydride (0.72%) and reacted with an oxazoline functionalized polystyrene copolymer of styrene/acrylonitrile/oxazoline (70/30/1) so as to incorporate 20% of the RPS, was blended with LEXAN 141. This sample was prepared and tested with 20% functionalized elastomeric polymer.

TABLE I

| Example | Spiral Flow (Cm. @ 1100 psi) | Flexural Modulus ($10^5$ psi) | IZOD Impact Strength Notched (Ft.-lb./in.) | | | | | | | | | |
|---|---|---|---|---|---|---|---|---|---|---|---|---|
| | | | Room[1] Temp. | 0° C.[1] | −20° C.[1] | −40° C.[1] | Room[2] Temp. | Room[3] Temp. | 0° C.[3] | −20° C.[3] | Room[4] Temp. | 0° C.[4] | −20° C.[4] |
| Comparison 1 | 4.8 | 3.49 | 17.5 | 17.6 | 3.1 | 2.8 | 2.4 | 3.0 | 1.8 | 3.2 | 1.5 | 1.6 | 1.8 |
| Comparison 1A | 10.0 | 2.85 | 10.0 | 9.5 | 9.2 | 5.0 | 10.3 | 8.6 | 7.9 | 4.1 | 8.6 | 8.3 | 7.8 |
| Comparison 1B | 14.0 | 2.42 | 8.0 | 7.4 | 4.3 | 2.7 | 7.0 | 6.2 | 6.1 | 2.8 | 6.7 | 6.1 | 3.1 |
| Comparison 1C | 20.0 | 1.83 | 6.5 | 6.3 | 7.0 | 2.5 | 4.6 | 7.1 | 8.3 | 2.7 | 4.8 | 4.5 | 7.5 |
| 2A | 8.5 | 3.01 | 13.1 | 12.5 | 12.2 | 5.2 | 8.7 | 11.7 | 11.0 | 10.8 | 11.2 | 10.2 | 9.1 |
| 2B | 8.0 | 2.89 | 12.9 | 12.9 | 13.0 | 11.4 | 9.9 | 14.1 | 11.4 | 13.6 | 12.0 | 12.4 | 11.6 |
| 2C | 11.0 | 2.37 | 13.7 | 14.1 | 17.1 | 6.2 | 7.9 | 14.2 | 12.5 | 15.7 | 11.6 | 12.9 | 13.1 |
| 3A | 8.0 | 3.18 | 13.4 | 13.0 | 13.3 | 5.3 | 10.4 | 12.3 | 11.2 | 10.5 | 11.9 | 10.9 | 8.0 |
| 3B | 11.5 | 2.81 | 13.1 | 12.7 | 13.0 | 6.9 | 8.9 | 15.0 | 12.1 | 14.1 | 12.9 | 12.6 | 12.8 |
| 3C | 11.5 | 2.51 | 13.1 | 14.5 | 15.0 | 6.9 | 8.0 | 14.5 | 12.3 | 14.1 | 12.4 | 13.8 | 12.5 |
| 4A | 8.0 | 3.15 | 13.0 | 13.3 | 12.8 | 6.5 | 10.8 | 14.3 | 11.6 | 13.4 | 12.0 | 11.7 | 10.1 |
| 4B | 10.0 | 2.92 | 13.2 | 13.3 | 13.4 | 5.7 | 9.2 | 14.5 | 13.2 | 14.0 | 12.4 | 12.9 | 11.7 |
| 4C | 14.0 | 2.60 | 11.7 | 10.3 | 4.6 | 2.5 | 7.8 | 11.9 | 10.0 | 5.1 | 9.0 | 11.4 | 1.8 |
| 5 | 9.8 | 2.60 | 12.2 | 12.7 | 12.0 | 5.7 | 8.6 | — | — | — | — | — | — |

[1] ⅛″ thick (3.2 mm).
[2] ¼″ thick (6.4 mm).
[3] ⅛″ thick (3.2 mm), after aging 4 hours at 125° C.
[4] ⅛″ thick (3.2 mm), after aging 24 hours at 125° C.

As indicated in this table the modified polycarbonate compositions Examples 2–5 show improved flow properties as compared to the unmodified polycarbonate resin in Comparison Example 1. Examples 2, 3A–C, 4A–B, and 5 also show improved impact properties at all temperatures over Comparison Examples 1A–1C, and at temperatures below −20° C. over Comparison Example 1. The thick section impact properties (at ¼″ (6.4 mm) thickness) at room temperature show improvement for Examples 2–5 over Example 1, and over Comparison Examples 1B and 1C where the proportion of impact modifier was increased to levels of 20% and 30%. The impact properties after aging at elevated temperatures show marked improvement for Examples 2–4 over Comparison Examples 1, 1A–1C at all temperatures except for at −20° C. (Example 4C). In this last case the modified composition showed impact properties equivalent to those of the unmodified resin.

Various changes and modifications in the products and process of this invention can be made without departing from the spirit and scope thereof. The various embodiments which have been disclosed herein were for the purpose of further illustrating the invention but were not intended to limit it.

The following is claimed:

1. An aromatic carbonate composition comprised of:
   (a) at least one aromatic carbonate resin; and
   (b) a functionalized elastomeric polymer comprising the reaction product of (i) an ethylene elastomer having at least one reactive polar group and (ii) an oxazoline functionalized polystyrene.

2. The aromatic carbonate composition of claim 1 wherein said aromatic carbonate resin is an aromatic polycarbonate resin.

3. The aromatic carbonate composition of claim 1 wherein said ethylene elastomer having at least one reactive polar group comprises an ethylene-containing elastomeric polymer that has been copolymerized with at least one ethylenically-unsaturated polar group-containing compound.

4. The aromatic carbonate composition of claim 3 wherein the polar groups of said at least one ethylenically-unsaturated polar group-containing compound are selected from the group consisting of carboxy, hydroxy, primary and secondary amino.

5. The aromatic carbonate composition of claim 1 wherein said ethylene elastomer having reactive polar groups comprises an ethylene-containing elastomeric polymer that has been grafted with at least one ethylenically-unsaturated carboxyl group-containing compound.

6. The aromatic carbonate composition of claim 5 wherein said ethylene-containing elastomeric polymer is an ethylene-alpha-olefin elastomer.

7. The aromatic carbonate composition of claim 6 wherein said ethylene-alpha-olefin elastomer comprises copolymerized ethylene and propylene and said ethylenically-unsaturated carboxyl group-containing compound is maleic anhydride.

8. The aromatic carbonate composition of claim 1 wherein said oxazoline functionalized polystyrene comprises copolymerized styrene and at least one ethylenically unsaturated monomer containing a cyclic iminoether group.

9. The aromatic carbonate composition of claim 8 wherein said ethylenically unsaturated monomer containing a cyclic iminoether group is a 2-alkenyl-2-oxazoline.

10. The aromatic carbonate composition of claim 9 wherein said 2-alkenyl-2-oxazoline is 2-isopropenyl-2-oxazoline.

11. The aromatic carbonate composition of claim 7 wherein said oxazoline functionalized polystyrene comprises copolymerized styrene and 2-isopropenyl-2-oxazoline.

12. The aromatic carbonate composition of claim 7 wherein said oxazoline functionalized polystyrene comprises copolymerized styrene, acrylonitrile and 2-isopropenyl-2-oxazoline.

13. The aromatic carbonate composition of claim 1 comprising from 2 to 35 weight percent of said functionalized elastomeric polymer.

14. The aromatic carbonate composition of claim 1 wherein said ethylene elastomer having at least one reactive polar group comprises an ethylene-containing elastomeric polymer that has bee n grafted with at least one ethylenically-unsaturated compound having polar groups reactive with oxazoline.

15. The aromatic carbonate composition of claim 14 wherein the polar groups of said at least one ethylenically-unsaturated compound having polar groups reactive with oxazoline are selected from the group consisting of carboxy, hydroxy, epoxy, primary and secondary amino.

16. The aromatic carbonate composition of claim 15 wherein said oxazoline functionalized polystyrene comprises copolymerized styrene and a 2-alkenyl-2-oxazoline.

17. The aromatic carbonate composition of claim 16 wherein said 2-alkenyl-2-oxazoline is 2-isopropenyl-2-oxazoline.

18. The aromatic carbonate composition of claim 17 wherein said oxazoline functionalized polystyrene additionally comprises copolymerized acrylonitrile.

19. The aromatic carbonate composition of claim 14 comprising from 2 to 35 weight percent of said functionalized elastomeric polymer.

20. The aromatic carbonate composition of claim 1 wherein said ethylene elastomer having at least one reactive polar group comprises an ethylene-containing elastomeric polymer that has been epoxidized.

* * * * *